(12) United States Patent
Lee et al.

(10) Patent No.: US 9,588,512 B2
(45) Date of Patent: Mar. 7, 2017

(54) SETTING METHOD OF REVOLUTIONS PER MINUTE ON REAL TIME OF SPINNING CUTTING TOOL, AND CONTROL DEVICE

(71) Applicant: DOOSAN INFRACORE CO., LTD., Incheon (KR)

(72) Inventors: Kang Jae Lee, Gyeonggi-do (KR); Jin Suk Song, Gyeonggi-do (KR)

(73) Assignee: Doosan Machine Tools Co., Ltd., Gyeongsangnam-do (KR)

( * ) Notice: Subject to any disclaimer, the term of this patent is extended or adjusted under 35 U.S.C. 154(b) by 339 days.

(21) Appl. No.: 14/300,417

(22) Filed: Jun. 10, 2014

(65) Prior Publication Data

US 2014/0364991 A1    Dec. 11, 2014

(30) Foreign Application Priority Data

Jun. 10, 2013 (KR) ........................ 10-2013-0065826

(51) Int. Cl.
- *G06F 19/00* (2011.01)
- *G05B 19/416* (2006.01)
- *G05B 19/404* (2006.01)

(52) U.S. Cl.
CPC ....... *G05B 19/4163* (2013.01); *G05B 19/404* (2013.01); *G05B 2219/37434* (2013.01); *G05B 2219/41256* (2013.01); *G05B 2219/49074* (2013.01)

(58) Field of Classification Search
USPC ........................................ 700/173, 175, 179
See application file for complete search history.

(56) References Cited

U.S. PATENT DOCUMENTS

| | | | | |
|---|---|---|---|---|
| 5,957,016 A | * | 9/1999 | Segalman | ............... B23B 31/00 409/141 |
| 6,330,848 B1 | * | 12/2001 | Nishio | ................. B23D 47/005 83/62.1 |
| 9,008,823 B2 | * | 4/2015 | Wang | ................. G05B 23/0235 700/108 |
| 2008/0033695 A1 | | 2/2008 | Sahara et al. | |
| 2010/0034609 A1 | * | 2/2010 | Doppenberg | ...... B23Q 11/0039 409/131 |
| 2012/0010744 A1 | | 1/2012 | Yamashita et al. | |
| 2012/0065766 A1 | * | 3/2012 | Yoshino | ............. B23Q 17/0976 700/173 |

(Continued)

FOREIGN PATENT DOCUMENTS

| CN | 101417398 A | 4/2009 |
|---|---|---|
| CN | 101722438 A | 6/2010 |

(Continued)

OTHER PUBLICATIONS

WO/2013/073436; Yoshikawa et al., translated to English using WIPO site, 19 pages; publication date of May 23, 2013.*

(Continued)

*Primary Examiner* — Ronald Hartman, Jr.
(74) *Attorney, Agent, or Firm* — John D. Veldhuis-Kroeze; Westman, Champlin & Koehler, P.A.

(57) ABSTRACT

Disclosed is a setting method of revolutions per minute on a real time of a rotating cutting tool, and a control device, and more particularly, a vibration characteristic is consistently evaluated and analyzed when a cutting process is in progress to suppress and avoid suppression.

12 Claims, 7 Drawing Sheets

(56) References Cited

U.S. PATENT DOCUMENTS

| | | | | |
|---|---|---|---|---|
| 2013/0164092 A1* | 6/2013 | Kondo | ................. | G05B 19/404 |
| | | | | 409/132 |
| 2013/0211574 A1* | 8/2013 | Wang | ................. | B23Q 17/0976 |
| | | | | 700/175 |
| 2013/0309034 A1* | 11/2013 | Inagaki | .............. | B23Q 17/0976 |
| | | | | 409/132 |

FOREIGN PATENT DOCUMENTS

| | | | |
|---|---|---|---|
| CN | 102387892 | A | 3/2012 |
| JP | 2008290194 | A | 12/2008 |
| JP | 2010105160 | A | 5/2010 |
| WO | 2013073436 | A1 | 5/2013 |
| WO | 2013150905 | A1 | 10/2013 |

OTHER PUBLICATIONS

European Search Report dated Dec. 8, 2014 for corresponding European Application No. 14171815.5, 11 pages.
Chinese Office Action dated Jan. 14, 2016 for Chinese Application No. 201410256845.7, 7 pages.

* cited by examiner

Fig. 1

(A) PROCESSING IS STABLE, PEAK IS TEMPORARILY FORMED (B) PROCESSING IS STABLE, PEAK IS PERIODICALLY FORMED (C) PROCESSING IS UNSTABLE,
AMPLITUDE IS LARGE AND PEAK IS IRREGULARLY GENERATED

REVOLUTIONS PER MINUTE OF SPINDLE IS SET TO 3300 RPM k≠Integer
Th = 19.52
-> severe chatter

SETTING METHOD OF REVOLUTIONS PER MINUTE ON REAL TIME OF SPINNING CUTTING TOOL, AND CONTROL DEVICE

CROSS-REFERENCE TO RELATED APPLICATIONS

This application is based on and claims priority from Korean Patent Application No. 10-2013-0065826, filed on 10 Jun. 2013, with the Korean Intellectual Property Office, the disclosure of which is incorporated herein in its entirety by reference.

FIELD OF THE DISCLOSURE

The present disclosure relates to a setting method of revolutions per minute on a real time of a rotating cutting tool, and a control device, and more particularly, to a setting method of revolutions per minute on a real time of a rotating cutting tool that can reduce vibration at the time of performing a cutting process of a workpiece by a rotating cutting tool, and a control device.

BACKGROUND OF THE DISCLOSURE

In general, a movement path of a tool and revolutions per minute of the tool are numerically controlled, and as a result, a machine tool performs a cutting process of a work. Examples of a machine tool include a machining center, a turning center, an NC milling machine, and the like. The machine tool is also referred to as a numerically controlled composite machine.

The tool includes a rotating cutting tool that performs a cutting process on a workpiece which is rotated and stopped while being mounted on a spindle. Examples of the rotating cutting tool include an end mil, a milling tool, a drilling tool, a boring tool, and the like. Hereinafter, the "rotating cutting tool" is abbreviated as the "tool".

It is evaluated that productivity of the machine tool is good as material removal rate (MRR) per time is higher and it is evaluated that a processing grade is good as surface roughness of a processing surface is smooth.

A cutting volume per time is determined according to cutting condition elements such as a radial cutting depth, an axial cutting depth, main axis revolutions per minute, and a movement speed. If any one of the cutting condition elements is increased, the cutting volume is increased.

Meanwhile, there is a case that a cutting condition of the tool is presented as a manual recommendation condition by a tool manufacturer. However, the manual recommendation condition is provided based on a maximum allowable static processing load and is a value in which a chatter vibration characteristic which occurs during the cutting process is not reflected.

Accordingly, there is a problem in that it is impossible to handle breakage of the tool or the workpiece under chatter vibration which occurs during the cutting process and a dynamic processing load amplified through the chatter vibration. As a result, a worker tends to perform the cutting process by setting a much more stable cutting condition than the manual recommendation condition.

The processing condition includes a tool type, a tool shape, a tool protruding length, the number of tool blades, hardness of the work, processing point positions (X, Y, and Z coordinate positions) in a factory machine, and the like and the chatter vibration has a characteristic that the chatter vibration is continuously varied according to the processing condition.

That is, the worker applies a very conservative cutting condition among the manual recommendation conditions presented by the tool manufacture in order to ensure a processing quality, and as a result, the productivity deteriorates.

Accordingly, vibration suppression and vibration avoidance through evaluation and analysis of a vibration characteristic are continuously required when the cutting process is in progress in order to satisfy both productivity improvement and the processing grade.

SUMMARY

The present disclosure has been made in an effort to provide a setting method of revolutions per minute on a real time of a rotating cutting tool that can continuously suppress and avoid vibration through evaluation and analysis of a vibration characteristic when a cutting process is in progress, and a control device.

Technical objects to be solved by the present disclosure are not limited to the aforementioned technical objects and unmentioned technical objects will be clearly understood by those skilled in the art from the specification and the appended claims.

An exemplary embodiment of the present disclosure provides a setting method of revolutions per minute on a real time of a rotating cutting tool for use with a machine tool, the method comprising: while a cutting processing is performed on a workpiece by the rotating cutting tool, calculating a chatter threshold index Th value at a ratio of a chatter vibration size $M_{Fc}$ to a cutting vibration size $M_{Ft}$, by Equation 1; in a case in which the chatter threshold index Th reaches a set value of the chatter threshold index Th, determining the case as a symptom of abnormal chatter vibration, and calculating a recommended revolutions per minute of the tool and adjusting the revolutions per minute of the rotating cutting tool to the recommended revolutions per minute of the rotating cutting tool in real time.

$$Th = \frac{M_{Fc}}{M_{Ft}} \qquad \text{[Equation 1]}$$

Th: Chatter threshold index
$M_{Fc}$: Chatter vibration size
$M_{Ft}$: Cutting vibration size The set value of the chatter threshold index Th is in the range of 2 to 10.

The recommended revolutions per minute of the tool is calculated by Equations 3 and 4.

$$\Omega_j = \frac{60\omega_n}{jN_f} \qquad \text{[Equation 3]}$$

$\Omega_j$: Recommended revolutions per minute
$\omega_n$: Chatter frequency
j: Integer
$N_f$: The number of blades of tool $$\kappa = \frac{60\omega_n}{\Omega_{ini}N_f} \qquad \text{[Equation 4]}$$

κ: Revolutions per minute optimization degree
$\omega_n$: Chatter frequency
$\Omega_{ini}$: Initial or current applied revolutions per minute
$N_f$: The number of blades of tool in Equation 4, when a value of k is within the range of −0.1 to +0.1 in an integer, the value of k may be judged as the integer value.

Another exemplary embodiment of the present disclosure provides a setting method of revolutions per minute on a real time of a rotating cutting tool for use with a machine tool, the method comprising: while a cutting processing is performed on a workpiece by the rotating cutting tool, a chatter transient index Tr is calculated at a ratio of an instantaneous gradient $G_i$ a specific timing (see S1, S2, and S3) and a moving average of gradient $G_{ma}$ of a past time interval (see ma1, ma2, and ma3) from the specific timing;

when the chatter transient index Tr reaches a judgment reference value of an abnormal chatter vibration, it is judged that there is a symptom of the abnormal chatter vibration, and calculating a recommended revolutions per minute of the tool and adjusting the revolutions per minute of the rotating cutting tool to the recommended revolutions per minute of the rotating cutting tool in real time.

$$Tr = \frac{G_i}{G_{ma}} \quad \text{[Equation 2]}$$

Tr: Chatter transient index
$G_i$: Instantaneous gradient
$G_{ma}$: Moving average of gradient The judgment reference value of the chatter transient index Tr is in the range of 0.5 to 2.

The recommended revolutions per minute of the tool is calculated by Equations 3 and 4.

$$\Omega_j = \frac{60\omega_n}{jN_f} \quad \text{[Equation 3]}$$

$\Omega_j$: Recommended revolutions per minute
$\omega_n$: Chatter frequency
j: Integer
$N_f$: The number of blades of tool $$\kappa = \frac{60\omega_n}{\Omega_{ini}N_f} \quad \text{[Equation 4]}$$

κ: Revolutions per minute optimization degree
$\omega_n$: Chatter frequency
$\Omega_{ini}$: Initial or current applied revolutions per minute
$N_f$: The number of blades of tool in Equation 4, when a value of k is within the range of −0.1 to +0.1 in an integer, the value of k may be judged as the integer value.

Yet another exemplary embodiment of the present disclosure provides a setting method of revolutions per minute on a real time of a rotating cutting tool for use with a machine tool, the method comprising: while a cutting processing is performed on a workpiece by the rotating cutting tool, calculating a chatter threshold index Th value at a ratio of a chatter vibration size MFc to a cutting vibration size MFt, by Equation 1; a chatter transient index Tr is calculated at a ratio of an instantaneous gradient Gi a specific timing (see S1, S2, and S3) and a moving average of gradient Gma of a past time interval (see ma1, ma2, and ma3) from the specific timing, by Equation 2; in a case in which the chatter threshold index Th reaches a set value of the chatter threshold index Th and the chatter transient index Tr reaches a judgment reference value of an abnormal chatter vibration, determining the case as a symptom of abnormal chatter vibration, and calculating a recommended revolutions per minute of the tool and adjusting the revolutions per minute of the rotating cutting tool to the recommended revolutions per minute of the rotating cutting tool in real time.

$$Th = \frac{M_{Fc}}{M_{Ft}} \quad \text{[Equation 1]}$$

Th: Chatter threshold index
$M_{Fc}$: Chatter vibration size
$M_{Ft}$: Cutting vibration size $$Tr = \frac{G_i}{G_{ma}} \quad \text{[Equation 2]}$$

Tr: Chatter transient index
$G_i$: Instantaneous gradient
$G_{ma}$: Moving average of gradient The set value of the chatter threshold index Th is in the range of 2 to 10, and the determination reference value of the abnormal chatter vibration of the chatter transient index Tr is in the range of 0.5 to 2

The revolutions per minute of the tool is calculated by Equations 3 and 4.

$$\Omega_j = \frac{60\omega_n}{jN_f} \quad \text{[Equation 3]}$$

$\Omega_j$: Recommended revolutions per minute
$\omega_n$: Chatter frequency
j: Integer
$N_f$: The number of blades of tool $$\kappa = \frac{60\,\omega_n}{\Omega_{ini}N_f} \quad \text{[Equation 4]}$$

κ: Revolutions per minute optimization degree
$\omega_n$: Chatter frequency
$\Omega_{ini}$: Initial or current applied revolutions per minute
$N_f$: The number of blades of tool in Equation 4, when a value of k is within the range of −0.1 to +0.1 in an integer, the value of k may be judged as the integer value.

Still another exemplary embodiment of the present disclosure provides a control device for setting revolutions per minute on a real time of a rotating cutting tool, which controls a machine tool so as to adjust the revolutions per minute of a tool by the recommended revolutions per minute of the tool calculated by the setting method of revolutions per minute on a real time of the rotating cutting tool.

Other detailed contents of the exemplary embodiments are included in the description and drawings.

According to exemplary embodiments of the present disclosure, a setting method of revolutions per minute on a real time of a rotating cutting tool, and a control device can ensure processing stability by adjusting revolutions per minute of a tool while a cutting process is performed.

The setting method of revolutions per minute on a real time of a rotating cutting tool, and the control device of the present disclosure, since a tool movement path which has already been set is not changed, a cutting process is not significantly changed, thereby preventing a work volume of a worker from being increased.

The setting method of revolutions per minute on a real time of a rotating cutting tool, and the control device of the present disclosure, chatter energy can be evaluated dually at an individual processing timing and a gradual (transitional) timing and chatter occurrence requiring change of a cutting process condition can be rapidly and accurately recognized through the evaluation of the chatter energy.

The setting method of revolutions per minute on a real time of a rotating cutting tool, and the control device of the present disclosure a tool life-span and a workpiece can be ultimately protected through vibration reduction and vibration avoidance of the cutting process and productivity can be improved by shortening a processing time.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Various advantages and features of the present disclosure and methods accomplishing thereof will become apparent from the following description of embodiments with reference to the accompanying drawings.

Hereinafter, embodiments of the present disclosure will be described in detail with reference to the accompanying drawings. Embodiments described hereinafter are exemplarily described in order to assist understanding the present disclosure and it should be understood that the embodiments of the present disclosure are variously modified and executed unlike the embodiments described herein. However, in describing the present disclosure, when it is determined that the detailed description of related known functions or components may obscure the gist of the present disclosure, the detailed description and concrete illustration will be omitted. Further, the accompanying drawings are not illustrated in an actual scale but some components may be enlarged in order to understand the present disclosure.

Meanwhile, since terms to be described below as terms set by considering the function in the present disclosure may depend on according to an intention or a custom of a producer, the terms will be defined based on contents throughout the specification.

Like reference numerals indicate like elements throughout the specification.

First, a characteristic of vibration generated during a cutting process will be described with reference to FIG. 1.

Figure 1:
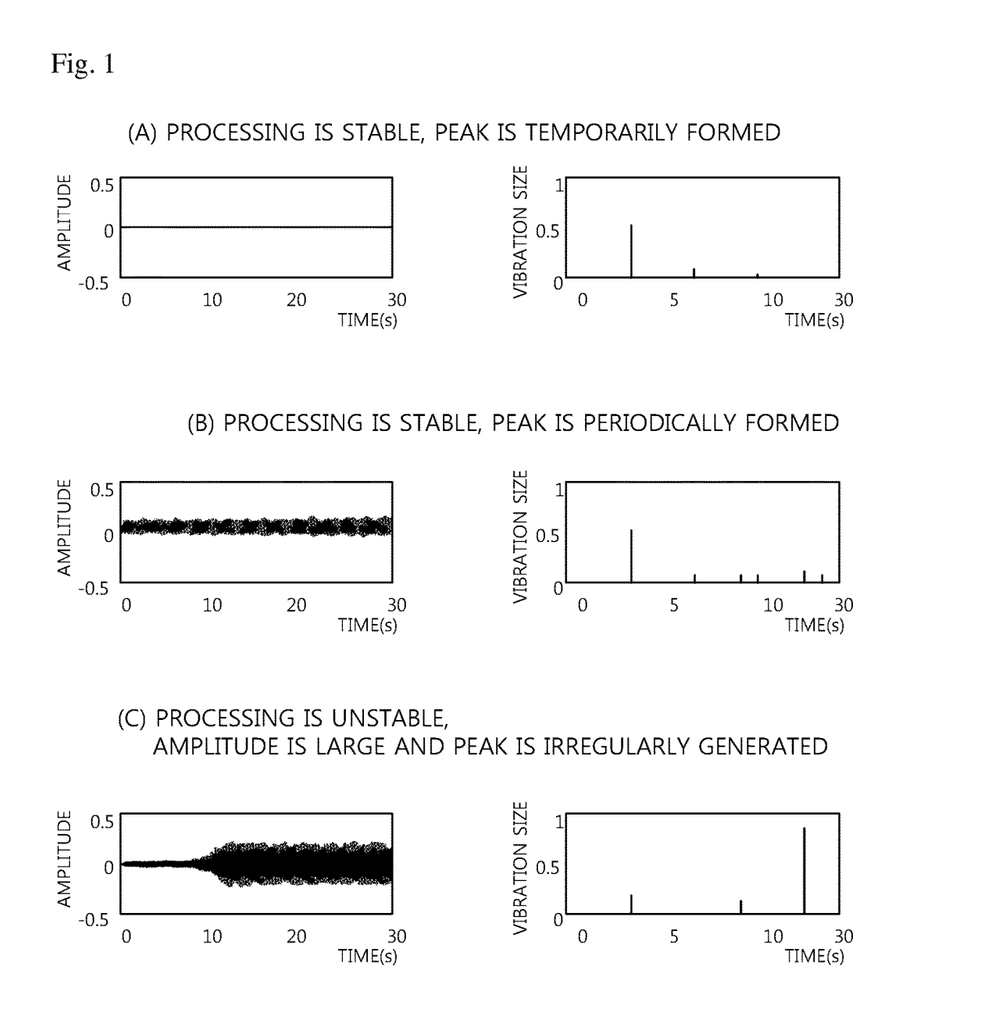
FIG. 1 is a diagram for describing whether vibration generated during a cutting process is normal or erroneous.

FIG. 1 accompanied is a diagram for describing whether vibration generated during a cutting process is normal or erroneous.

A plurality of blades of the tool is provided. Meanwhile, vibration may be generated at the moment when the cutting blades of the tool hit a work. That is, the vibration is essentially generated during a cutting process, but the cutting blade rotates, and as a result, peculiar vibration will be periodically generated and amplitudes when the peculiar vibration is generated may have similar sizes.

FIGS. 1A and 1B are diagrams for describing vibration generated while processing is stable and amplitude thereof and it may be known that a peak is formed repeatedly at a similar cycle with narrow amplitude. Further, to describe based on the further subdivided time, since the vibration is generated at the moment when the cutting blade hits the work, it may be shown as if the peak is intermittently formed while monitoring the vibration.

However, when the cutting process becomes unstable, the characteristic of the vibration is changed. When the cutting process becomes unstable, the amplitude is narrow and thereafter, widened as illustrated in FIG. 1C. Further, it may be known that a generation cycle of the vibration is irregular and the size of the vibration is very large when the vibration is generated.

That is, the vibration shows obviously different aspects when the cutting process is stable and when the cutting process is unstable.

Figure 2:
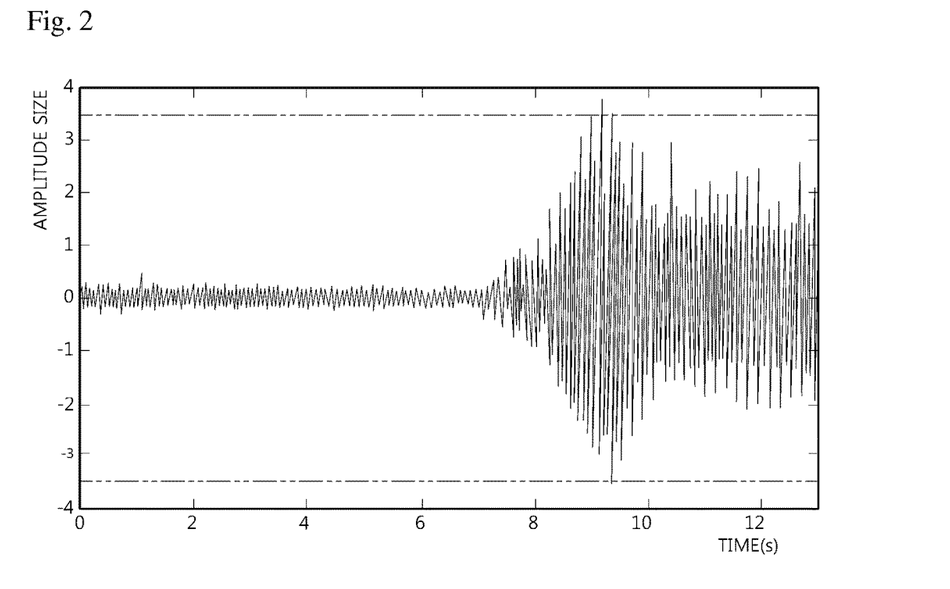
FIGS. 2 and 3 are diagrams for describing a characteristic of the vibration generated during the cutting process.
Figure 3:
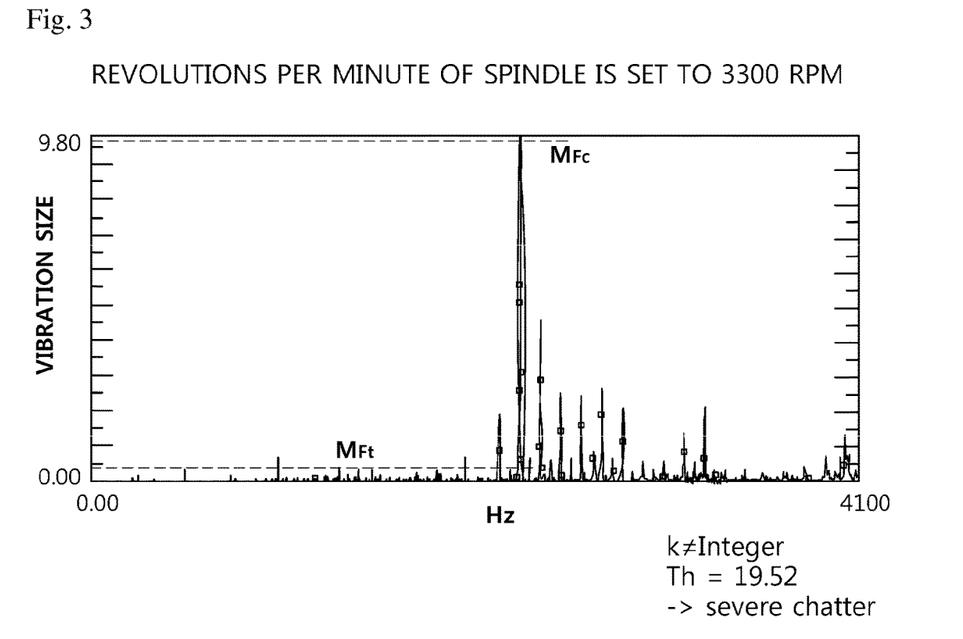

The characteristic of the vibration when the cutting process is unstable will be described in more detail with reference to FIGS. 2 and 3 which are accompanied. FIGS. 2 and 3 accompanied are diagrams for describing a characteristic of the vibration generated during the cutting process.

When the cutting process is performed, a processing condition cannot but be changed with time and as the processing condition is changed, a possibility that the vibration will be generated is increased. FIGS. 2 and 3 are diagrams illustrating when a stable state is changed to an unstable state.

As illustrated in FIG. 2, when abnormal vibration starts being generated, the size of the amplitude is abruptly increased from the moment when the abnormal vibration is generated. Further, as illustrated in FIG. 3, the vibration size is very large.

Therefore, the exemplary embodiment of the present disclosure is to provide a method and a control device that can avoid chatter vibration when the cutting process is performed.

In order to ensure stability of the cutting process by avoiding the chatter vibration in real time, the vibration characteristic indicating whether vibration information is normal or abnormal is evaluated and analyzed, and when it is determined that the vibration information is abnormal, it is very important to select optimal revolutions per minute of the tool.

According to the exemplary embodiment of the present disclosure, it is determined that the vibration is normal when the chatter vibration is not generated or the vibration is light chatter vibration in which changing the revolutions per minute is unnecessary or temporary chatter vibration.

In the exemplary embodiment of the present disclosure, it is determined whether the revolutions per minute of the tool need to be changed by evaluating and analyzing the chatter vibration characteristic.

Meanwhile, as described above, in a situation in which changing the revolutions per minute of the tool is required due to the chatter vibration, the optimal revolutions per minute of the tool need to be selected and presented in the present situation. The revolutions per minute of the tool may be understood as having the same concept as the main axis revolutions per minute. The reason is that since the tool is mounted on a spindle, the spindle and the tool rotate together.

In the exemplary embodiment of the present disclosure, the chatter vibration is recognized more quickly to rapidly select the optimal revolutions per minute of the tool. This will be described with reference to FIGS. 4 and 5 accompanied.

Figure 4:
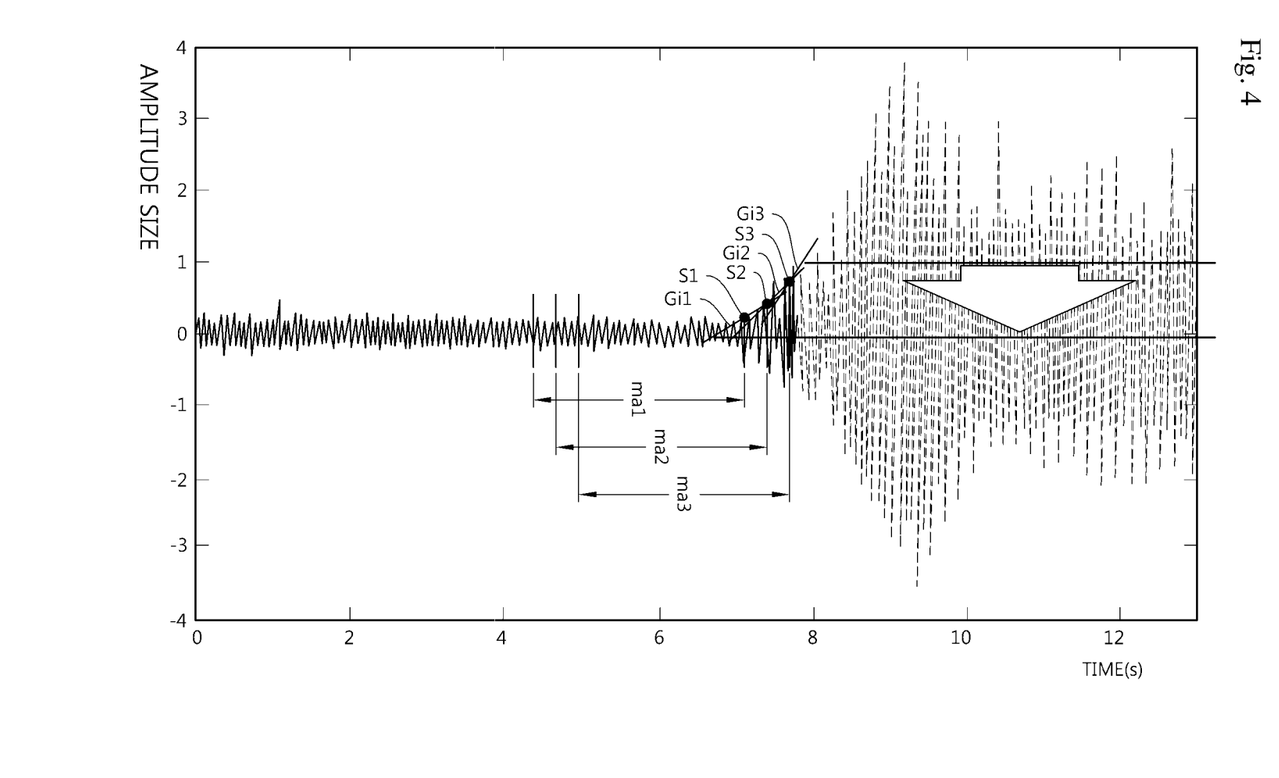
FIG. 4 is an exemplary diagram for describing a setting method of revolutions per minute on a real time of a rotating cutting tool according to an exemplary embodiment of the present disclosure.
Figure 5:
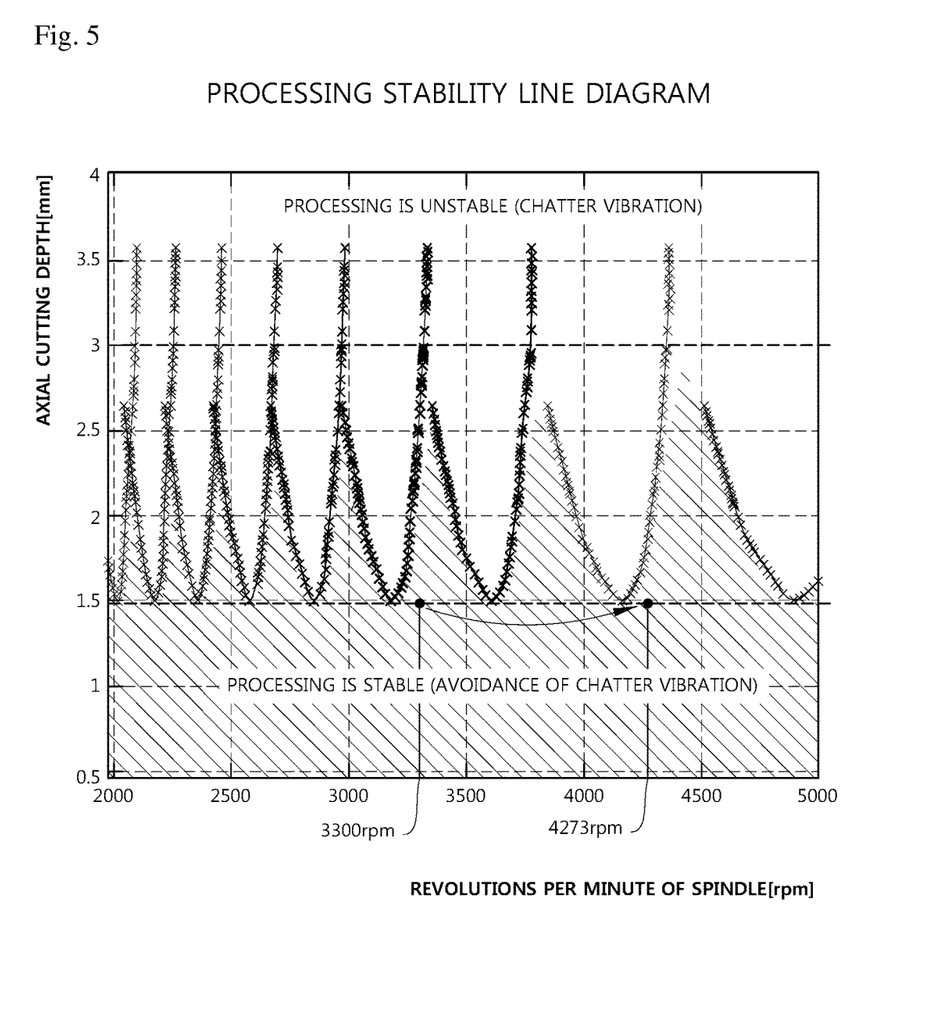
FIG. 5 is a processing stability lobes diagram showing an example in which revolutions per minute are changed by the setting method of revolutions per minute on a real time of the rotating cutting tool according to the exemplary embodiment of the present disclosure.

FIG. 4 accompanied is an exemplary diagram for describing a setting method of revolutions per minute on a real time of a rotating cutting tool according to an exemplary embodiment of the present disclosure. FIG. 5 is a processing stability lobes diagram showing an example in which revolutions per minute are changed by the setting method of revolutions on a real time of the rotating cutting tool according to the exemplary embodiment of the present disclosure.

First, when the chatter vibration is generated, a signal of the chatter vibration is generated and it is first evaluated whether the signal of the chatter vibration is meaningful and the moment of updating the revolutions per minute needs to be determined.

Whether it is necessary to update the revolutions per minute when the chatter vibration signal is generated is acquired by Equation 1.

$$Th = \frac{M_{Fc}}{M_{Ft}} \qquad \text{[Equation 1]}$$

Th: Chatter threshold index
$M_{Fc}$: Chatter vibration size
$M_{Ft}$: Cutting vibration size Selecting a chatter threshold index Th value is required and the chatter threshold index Th value is acquired by Equation 1. Equation 1 is for quantitative evaluation of the chatter vibration signal.

Since a cutting vibration size $M_{Ft}$ is the size of normal vibration which is generated while the cutting process is performed, the normal vibration is generated in a uniform pattern. On the contrary, since a chatter vibration size $M_{Fc}$ is shown when abnormal chatter vibration is generated, the chatter vibration is definitely distinguished from the cutting vibration.

The chatter threshold index Th value is to evaluate a chatter energy size to a normal processing energy size through a ratio (a chatter index) of the chatter vibration size $M_{Fc}$ to the cutting vibration size $M_{Ft}$. When the chatter vibration size $M_{Fc}$ is larger than the cutting vibration size $M_{Ft}$ generated by the cutting process, the chatter threshold index Th value is increased. When the chatter threshold index Th value is increased, this means that the abnormal chatter vibration is generated.

That is, when the chatter threshold index Th value is increased to a set value of the chatter threshold index Th or more at a specific individual moment while monitoring the vibration characteristic, the revolutions per minute is reselected. As the set value of the chatter threshold index Th is set to be larger, a frequency of reselecting the revolutions per minute is decreased, and as a result, the processing grade may deteriorate, whereas as the set value of the chatter threshold index Th is set to be smaller, the frequency of reselecting the revolutions per minute is increased, but although resetting is not performed, the processing grade may not deteriorate, and as a result, the appropriate set value of the chatter threshold index Th is required. Therefore, in the exemplary embodiment of the present disclosure, the set value of the chatter threshold index Th is preferably set to 2 to 10.

Meanwhile, in the exemplary embodiment of the present disclosure, as illustrated in FIG. 4, when vibration generated during a past time interval from a specific moment is monitored in real time and a tendency is confirmed, that sudden disturbance occurs or abnormal vibration is generated, and as a result, amplitude is increased, a chatter signal magnitude is determined as the moment when updating the revolutions per minute is required. This may be more accurately calculated by Equation 2.

$$Tr = \frac{G_i}{G_{ma}} \qquad \text{[Equation 2]}$$

Tr: Chatter transient index
$G_i$: Instantaneous gradient
$G_{ma}$: Moving average of gradient According to Equation 2, a chatter transient index Tr is acquired at a ratio between an instantaneous gradient $G_i$ at specific moments (see S1, S2, and S3) and a moving average of gradient $G_{ma}$ of a past time interval (see ma1, ma2, and ma3) from the specific moment.

Since the moment of acquiring the chatter transient index Tr is changed with time, the aforementioned time interval (see ma1, ma2, and ma3) is continuously changed. The time interval (see ma1, ma2, and ma3) may be set to 80 to 120 ms. In more detail, the time interval may be set to 100 ms. Reliability for a past vibration average index referred is increased as a range of the time interval is increased, but a data mount collected as much is increased. Meanwhile, a collected data mount referred is decreased as the range of the time interval is decreased, but there is a concern that an error will occur due to chatter of an abnormal peak which is intermittently generated. Accordingly, in order to rapidly calculate the chatter transient index value while ensuring an appropriate data volume, it is preferable to set the time interval to 80 to 120 ms.

Meanwhile, it is preferable that when the chatter transient index Tr is 0.5 to 2, it is determined that the vibration is the abnormal chatter vibration. For additional explanation, the moving average of gradient $G_{ma}$ is maintained uniformly while a stable cutting process is performed, but when vibration energy is abruptly increased, the instantaneous gradient $G_i$ may be abruptly increased, and as a result, the chatter transient index Tr value may be abruptly increased. Accordingly, depending on whether the gradient is abruptly changed, a symptom is determined in which the abnormal chatter vibration will be generated. When the chatter transient index Tr is 0.5 or more, adjusting the revolutions per minute of the tool is required and when the chatter transient index Tr is 2 or more, it may be determined that the chatter vibration excessively progresses, and as a result, a value of the chatter transient index Tr in the range from 0.5 to 2 is set as a reference for determining the abnormal chatter vibration.

Meanwhile, in the exemplary embodiment of the present disclosure, an instantaneous gradient at any one moment and an adjacent instantaneous gradient are not compared with each other, but an average of a past time interval and an instantaneous gradient are compared to exclude an error by noise, and as a result, reliability of a result value for the moment when the chatter vibration is generated is increased.

On the other hand, the abnormal chatter vibration may be more rapidly determined by Equation 2. The vibration size is gradually increased and an increased increment rate (gradient) is abruptly increased like the example of the vibration characteristic illustrated in FIG. 2 and according to another exemplary embodiment of the present disclosure, the abnormal chatter vibration may be rapidly determined when the symptom that the abnormal chatter vibration will be generated is shown by Equation 2, and as a result, the revolutions per minute of the tool is rapidly adjusted in response to the abnormal chatter vibration. Therefore, since the chatter vibration may be reduced before the vibration size is increased, the processing grade may be excellently maintained.

Since the revolutions per minute of the tool among the cutting conditions may be increased while the cutting process is performed, productivity is improved. As illustrated in FIG. 5, the revolutions per minute of the tool may be adjusted to be increased. FIG. 5 illustrates an example in which the revolutions per minute of the tool are changed from 3300 rpm to 4273 rpm.

As described above, when the revolutions per minute of the tool is changed, the revolutions per minute of the tool to be changed may be represented by Equations 3 and 4.

$$\Omega_j = \frac{60\, \omega_n}{j N_f} \qquad \text{[Equation 3]}$$

$\Omega_j$: Recommended revolutions per minute
$\omega_n$: Chatter frequency
j: Integer
$N_f$: The number of blades of tool In Equation 3, $\Omega_j$ represents the recommended revolutions per minute of the tool which is recommended. As the recommended revolutions per minute of the tool, the revolutions per minute are selected by matching a cycle which is integer times of the main axis revolutions per minute with a natural frequency of the tool. The natural frequency of the tool is a value that continuously exists as a natural characteristic. Meanwhile, j represents the stable revolutions per minute.

$$\kappa = \frac{60\, \omega_n}{\Omega_{ini} N_f} \qquad \text{[Equation 4]}$$

κ: Revolutions per minute optimization degree
$\omega_n$: Chatter frequency
$\Omega_{ini}$: Initial or current applied revolutions per minute
$N_f$: The number of blades of tool In Equation 4, k represents a natural frequency and has an integer value. In more detail, when the value of k is within the range of −0.1 to +0.1, the value of k is judged as the integer value. For example, when the k value is 3.05, since the k value belongs to the integer value judgment range, the k value is judged as the integer of 3. The reason is that the revolutions per minute is adjusted according to the integer, the value of the chatter frequency $\omega_n$ is adjusted by a small margin according to the new revolutions per minute.

Since the natural frequency consistently fluctuates during processing, the recommended revolutions per minute are consistently updated so that an integer relationship is maintained between the natural frequency and the revolutions per minute. The natural frequency is consistently varied during the cutting process due to tool abrasion, nonuniformity of hardness for each workpiece position, a decrease in volume of the workpiece by the cutting process, and the like. Meanwhile, in Equation 4, a phenomenon in which k is closer to the integer, k is closer to j of Equation 3 occurs. That is, in Equation 4, as k is closer to j in Equation 3, the revolutions per minute is optimized.

In Equation 4, the chatter frequency $\omega_n$ is accepted as a main mode frequency of a structure causing chatter vibration. For example, in the case of a machining center, the chatter frequency $\omega_n$ is generated from a tool, a holder, and a spindle. As a result, the chatter frequency $\omega_n$ may be a frequency generated from the tool, the holder, and the spindle.

When the cutting process is performed while the cutting depth is set to 1.5 mm, until the cutting process is ended, the cutting depth may not be changed and the tool will not be replaced and the material of the workpiece will not be changed, and as a result, an element which may be substantially changed among the cutting conditions is just the revolutions per minute of the tool. Like the example illustrated in FIG. 5, while the cutting process is initially performed with the revolutions per minute of the tool of 3300 rpm, the abnormal chatter vibration symptom is recognized by Equations 1 and 2 and the recommended revolutions per minute of the tool is presented by Equations 3 and 4. In the example of FIG. 5, the recommended revolutions per minute of the tool are presented as 4273 rpm.

Hereinafter, an action effect according to an exemplary embodiment of the present disclosure will be described with reference to FIG. 6.

Figure 6:
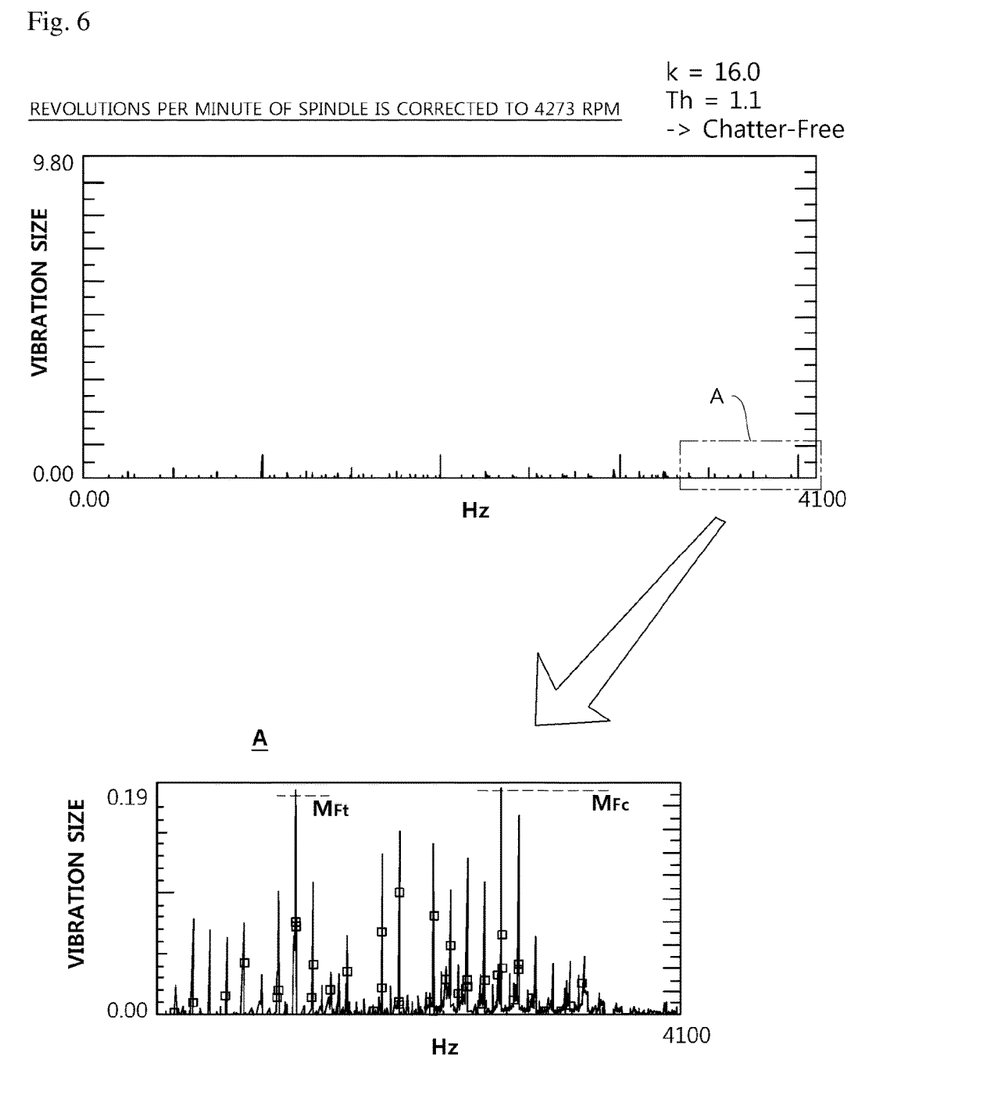
FIG. 6 is a diagram for describing vibration generated during the cutting process due to application of the revolutions changed by the setting method of revolutions on a real time of the rotating cutting tool according to the exemplary embodiment of the present disclosure.

FIG. 6 accompanied is a diagram for describing vibration generated during the cutting process due to application of the revolutions per minute changed by the setting method of revolutions per minute on a real time of the rotating cutting tool according to the exemplary embodiment of the present disclosure.

As illustrated in FIG. 6, it may be known that a vibration size is significantly decreased by adjusting only the revolutions per minute of the tool among the cutting conditions to the recommended revolutions per minute of the tool. That is, as compared with the vibration size of a Comparative Example illustrated in FIG. 3, it may be known that the chatter vibration size $M_{Fc}$ is definitely decreased. Further, it may be known that the cutting vibration size $M_{Ft}$ and the chatter vibration size $M_{Fc}$ are similar.

That is, the processing grade of the cutting process is not influenced by the chatter vibration, but may be maintained excellently after the revolutions per minute of the tool are adjusted.

Figure 7:
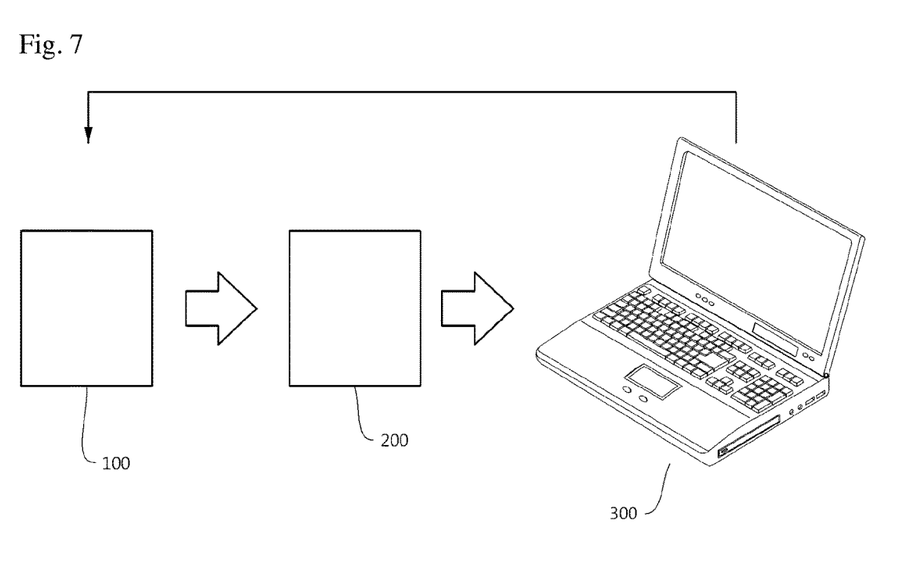
FIGS. 7 and 8 are exemplary diagrams for describing a setting method of revolutions per minute on a real time of a rotating cutting tool and an operation of a control device according to exemplary embodiments of the present disclosure.
Figure 8:
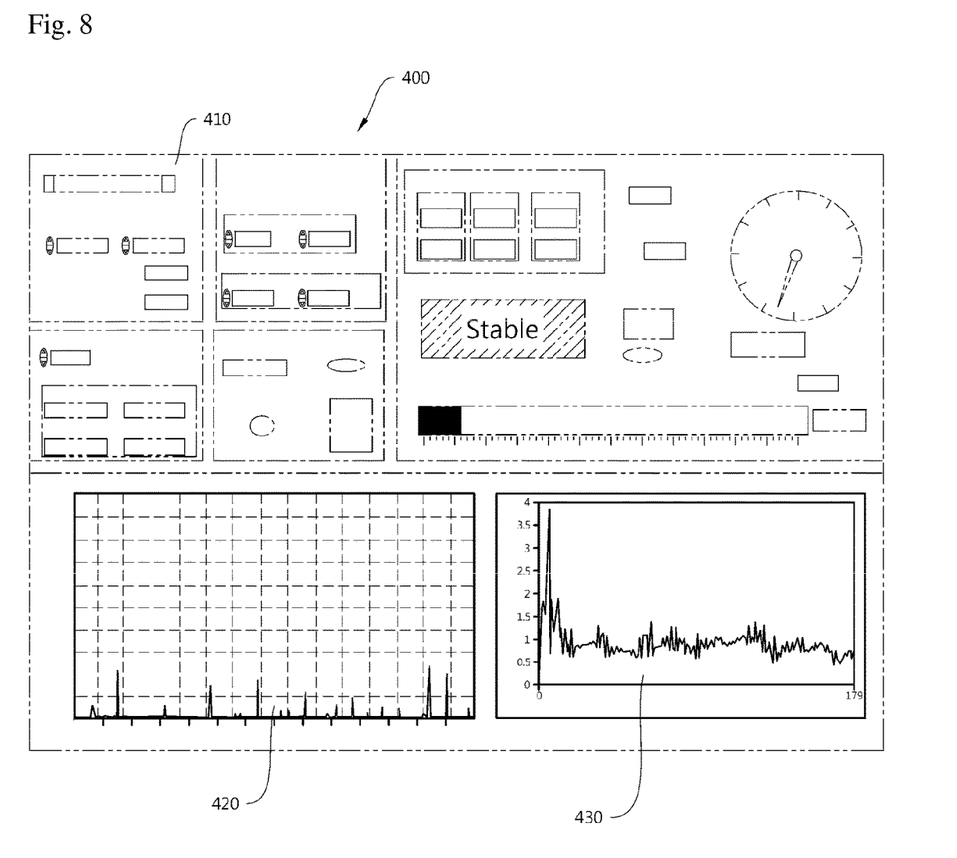

As described above, a method for presenting the recommended revolutions per minute of the tool is applied to a machine tool. This will be described with reference to FIGS. 7 and 8 which are accompanied. FIGS. 7 and 8 accompanied are exemplary diagrams for describing a setting method of revolutions per minute on a real time of a rotating cutting tool and an operation of a control device according to exemplary embodiments of the present disclosure.

A sensor that senses vibration is provided on a main axis of the machine tool 100 and vibration information is generated by the sensor to be transmitted to a vibration processing unit 200. The vibration processing unit 200 transmits information to a terminal 300 to allow a worker to know a vibration processing situation.

The terminal 300 serves as an input/output device of a computer and determines a vibration situation and adjusts the revolutions per minute of the tool against the vibration.

The aforementioned vibration processing unit 200 may be mounted on the machine tool and on the other hand, the vibration processing unit 200 may be disposed in a remote control room.

The terminal 300 may be provided in various types including a notebook computer, a tablet PC, a smart phone, and the like and the computer disposed in the remote control room may perform the function of the terminal 300.

A terminal display image 400 is displayed in the terminal 300. A data input/output unit 410 for inputting and managing various data values is provided in the terminal display image 400. Further, vibration amplitude output units 420 and 430 that output the size of the vibration and the width of the vibration are provided in the terminal display image 400.

A setting method of revolutions per minute on a real time of a rotating cutting tool according to an exemplary embodiment of the present disclosure may be mounted on the vibration processing unit 200 or the terminal 300. In any case, when the abnormal chatter vibration symptom is captured, the recommended revolutions per minute of the tool are displayed and the recommended revolutions per minute of the tool are fed back to the machine tool 100. The machine tool 100 may induce the recommended revolutions per minute of the tool to be automatically applied or induce the worker to apply the recommended revolutions per minute of the tool.

Accordingly, the setting method of revolutions per minute on a real time of a rotating cutting tool, and the control device according to the present disclosure can ensure processing stability by adjusting revolutions per minute of a tool while a cutting process is performed.

In the setting method of revolutions per minute on a real time for a rotating cutting tool and the control device, since a tool movement path which has already been set is not changed, a cutting process is not significantly changed, thereby preventing a work volume of a worker from being increased.

The setting method of revolutions per minute on a real time for a rotating cutting tool and the control device, chatter energy can be evaluated dually at an individual processing timing and a gradual (transitional) timing and chatter occurrence requiring change of a cutting process condition can be rapidly and accurately recognized through the evaluation of the chatter energy.

The setting method of revolutions per minute on a real time for a rotating cutting tool and the control device, a tool life-span and a workpiece can be ultimately protected through vibration reduction and vibration avoidance of the cutting process and productivity can be improved by shortening a processing time.

Although the embodiments of the present disclosure have been described with reference to the accompanying drawings as described above, those skilled in the art will be able to understand that the present disclosure can be implemented in other detailed forms without changing the technical spirit or an essential characteristic.

Therefore, it should be understood that embodiments described as above are exemplary in all aspects and are not limitative and it should be analyzed that the scope of the present disclosure is shown by the appended claims to be described below, and the meaning and the scope of the appended claims, and all changed or modified forms derived from the equivalents thereto are included in the scope of the present disclosure.

The setting method of revolutions per minute on a real time of a rotating cutting tool and the control device according to the exemplary embodiments of the present disclosure can be used to select an initial axial cutting depth at the time of performing the cutting process.

From the foregoing, it will be appreciated that various embodiments of the present disclosure have been described herein for purposes of illustration, and that various modifications may be made without departing from the scope and spirit of the present disclosure. The exemplary embodiments disclosed in the specification of the present disclosure will not limit the present disclosure. The scope of the present disclosure will be interpreted by the claims below, and it will be construed that all techniques within the scope equivalent thereto belong to the scope of the present disclosure.

What is claimed is:

1. A method, comprising:
   setting revolutions per minute in real time of a rotating cutting tool for use with a machine tool, the setting of revolutions comprising:
   while a cutting processing is performed on a workpiece by the rotating cutting tool,
   calculating a chatter threshold index Th value at a ratio of a chatter vibration size $M_{Fc}$ to a cutting vibration size $M_{Ft}$, by Equation 1, wherein Equation 1 is Th=$M_{Fc}$/$M_{Ft}$, wherein Th=a chatter threshold index, $M_{Fc}$=a chatter vibration size, and $M_{Ft}$=a cutting vibration size;
   in a case in which the chatter threshold index Th reaches a set value of the chatter threshold index Th, determining the case as a symptom of abnormal chatter vibration;
   calculating a recommended revolutions per minute of the tool, wherein the recommended revolutions per minute of the tool is calculated by Equations 3 and 4, wherein Equation 3 is $\Omega_j$=60 $\omega_n$/j $N_f$, wherein $\Omega_j$=a recommended revolutions per minute, $\omega_n$=a chatter frequency, j=an integer, and $N_f$=a number of blades of the tool, and wherein Equation 4 is $\kappa=60\ \omega_n/\Omega_{ini}\ N_f$, wherein $\kappa=$a revolutions per minute optimization degree, $\omega_n=$a chatter frequency, $\Omega_{ini}=$an initial or current applied revolutions per minute, and $N_f=$a number of blades of the tool; and adjusting the revolutions per minute of the rotating cutting tool to the recommended revolutions per minute of the rotating cutting tool in real time.

2. The method of claim 1, wherein the set value of the chatter threshold index Th is in the range of 2 to 10.

3. The method of claim 1, wherein in Equation 4, when a value of $\kappa$ is within the range of −0.1 to +0.1, the value of $\kappa$ is judged as an integer value.

4. A control device for setting revolutions per minute in real time of a rotating cutting tool, which controls a machine tool so as to adjust the revolutions per minute of a tool by the recommended revolutions per minute of the tool calculated by the setting method of revolutions per minute in real time of the rotating cutting tool according to claim 1.

5. A method, comprising:
setting revolutions per minute in real time of a rotating cutting tool for use with a machine tool, the setting of revolutions comprising:
while a cutting processing is performed on a workpiece by the rotating cutting tool,
calculating a chatter transient index Tr at a ratio of an instantaneous gradient $G_i$ at a specific timing and a moving average of gradient $G_{ma}$ of a past time interval from the specific timing, by Equation 2, wherein Equation 2 is $Tr=G_i/G_{ma}$, wherein Tr=a chatter transient index, $G_i=$an instantaneous gradient and $G_{ma}=$a moving average of the gradient;
wherein when the chatter transient index Tr reaches a judgment reference value of an abnormal chatter vibration, it is judged that there is a symptom of the abnormal chatter vibration;
calculating a recommended revolutions per minute of the tool, wherein the recommended revolutions per minute of the tool is calculated by Equations 3 and 4, wherein Equation 3 is $\Omega_j=60\ \omega_n/j\ N_f$, wherein $\Omega_j=$a recommended revolutions per minute, $\omega_n=$a chatter frequency, j=an integer, and $N_f=$a number of blades of the tool, and wherein Equation 4 is $\kappa=60\ \omega_n/\Omega_{ini}\ N_f$, wherein $\kappa=$a revolutions per minute optimization degree, $\omega_n=$a chatter frequency, $\Omega_{ini}=$an initial or current applied revolutions per minute, and $N_f=$a number of blades of the tool; and
adjusting the revolutions per minute of the rotating cutting tool to the recommended revolutions per minute of the rotating cutting tool in real time.

6. The method of claim 5, wherein the judgment reference value of the chatter transient index Tr is in the range of 0.5 to 2.

7. The method of claim 5, wherein in Equation 4, when a value of $\kappa$ is within the range of −0.1 to +0.1, the value of $\kappa$ is judged as an integer value.

8. A control device for setting revolutions per minute in real time of a rotating cutting tool, which controls a machine tool so as to adjust the revolutions per minute of a tool by the recommended revolutions per minute of the tool calculated by the setting method of revolutions per minute in real time of the rotating cutting tool according to claim 5.

9. A method, comprising:
setting revolutions per minute in real time of a rotating cutting tool for use with a machine tool, the setting of revolutions comprising:
while a cutting processing is performed on a workpiece by the rotating cutting tool,
calculating a chatter threshold index Th by Equation 1, wherein Equation 1 is $Th=M_{Fc}/M_{Ft}$, wherein Th=a chatter threshold index, $M_{Fc}=$a chatter vibration size, and $M_{Ft}=$a cutting vibration size;
a chatter transient index Tr is calculated at a ratio of an instantaneous gradient $G_i$ at a specific timing and a moving average of gradient $G_{ma}$ of a past time interval from the specific timing, by Equation 2, wherein Equation 2 is $Tr=G_i/G_{ma}$, wherein Tr=a chatter transient index, $G_i=$an instantaneous gradient and $G_{ma}=$a moving average of the gradient;
in a case in which the chatter threshold index Th reaches a set value of the chatter threshold index Th and the chatter transient index Tr reaches a judgment reference value of an abnormal chatter vibration, determining the case as a symptom of abnormal chatter vibration, and
calculating a recommended revolutions per minute of the tool and adjusting the revolutions per minute of the rotating cutting tool to the recommended revolutions per minute of the rotating cutting tool in real time, wherein the revolutions per minute of the tool is calculated by Equations 3 and 4, wherein Equation 3 is $\Omega_j=60\ \omega_n/j\ N_f$, wherein $\Omega_j=$a recommended revolutions per minute, $\omega_n=$a chatter frequency, j=an integer, and $N_f=$a number of blades of the tool, and wherein Equation 4 is $\kappa=60\ \omega_n/\Omega_{ini}\ N_f$, wherein $\kappa=$a revolutions per minute optimization degree, $\omega_n=$a chatter frequency, $\Omega_{ini}=$an initial or current applied revolutions per minute, and $N_f=$a number of blades of the tool.

10. The method of claim 9, wherein the set value of the chatter threshold index Th is in the range of 2 to 10, and the determination reference value of the abnormal chatter vibration of the chatter transient index Tr is in the range of 0.5 to 2.

11. The method of claim 9, wherein in Equation 4, when a value of $\kappa$ is within the range of −0.1 to +0.1, the value of $\kappa$ is judged as an integer value.

12. A control device for setting revolutions per minute in real time of a rotating cutting tool, which controls a machine tool so as to adjust the revolutions per minute of a tool by the recommended revolutions per minute of the tool calculated by the setting method of revolutions per minute in real time of the rotating cutting tool according to claim 9.

* * * * *